United States Patent
Jacobs

(10) Patent No.: US 9,014,098 B2
(45) Date of Patent: Apr. 21, 2015

(54) DIGITAL FIXED STATION INTERFACE (DFSI) INTERNET PROTOCOL TO BINARY SERIAL DATA PROTOCOL CONVERTER

(71) Applicant: ARINC Incorporated, Annapolis, MD (US)

(72) Inventor: Michael W. Jacobs, Annapolis, MD (US)

(73) Assignee: ARINC Incorporated, Annapolis, MD (US)

( * ) Notice: Subject to any disclaimer, the term of this patent is extended or adjusted under 35 U.S.C. 154(b) by 156 days.

(21) Appl. No.: 13/949,184

(22) Filed: Jul. 23, 2013

(65) Prior Publication Data

US 2014/0022993 A1 Jan. 23, 2014

Related U.S. Application Data

(60) Provisional application No. 61/674,788, filed on Jul. 23, 2012.

(51) Int. Cl.
*H04L 12/28* (2006.01)
*H04L 29/06* (2006.01)

(52) U.S. Cl.
CPC ...................... *H04L 69/08* (2013.01)

(58) Field of Classification Search
None
See application file for complete search history.

(56) References Cited

U.S. PATENT DOCUMENTS

| | | | | |
|---|---|---|---|---|
| 2003/0084200 A1* | 5/2003 | Buehler et al. | ................ | 709/318 |
| 2009/0174586 A1* | 7/2009 | Muenter et al. | ................ | 341/131 |
| 2010/0132445 A1* | 6/2010 | Tozawa et al. | ................. | 73/146 |
| 2010/0328059 A1* | 12/2010 | Kanenari | ..................... | 340/447 |
| 2011/0050490 A1* | 3/2011 | Matsue | .................. | 342/357.23 |
| 2011/0103164 A1* | 5/2011 | Yun et al. | ...................... | 365/201 |
| 2012/0078440 A1* | 3/2012 | Oravis et al. | ..................... | 701/1 |

\* cited by examiner

*Primary Examiner* — Otis L Thompson, Jr.
(74) *Attorney, Agent, or Firm* — Ronald E. Prass, Jr.; Prass LLP

(57) ABSTRACT

A system and method are provided for converting radio communication signals between a Digital Fixed Station Interface (DFSI) Internet Protocol (IP) APCO P25 standard communications format and binary serial data protocol standard communications. Received serial binary data may be evaluated, separated into control information and data payloads, and converted to DFSI IP standard data. Incoming and outgoing data communications are processed by implementing decisions about how to handle the information contained in, or to be contained in, the incoming and outgoing data communications based upon the substance, or overarching format, of the data contained in individual data packets, or serial bit streams. In embodiments, decisions and determinations regarding the information include determining that the information is damaged or corrupted and therefore not available to be converted. The data may be discarded based on such a determination.

21 Claims, 4 Drawing Sheets

DIGITAL FIXED STATION INTERFACE (DFSI) INTERNET PROTOCOL TO BINARY SERIAL DATA PROTOCOL CONVERTER

This application claims priority to U.S. Provisional Patent Application No. 61/674,788, entitled P25 Digital Fixed Station Interface (DFSI) To V.24 Standard Converter, filed on Jul. 23, 2012, the disclosure of which is hereby incorporated by reference herein in its entirety.

BACKGROUND

1. Field of the Disclosed Embodiments

The disclosed embodiments relate to systems and methods for converting radio communication signals between Digital Fixed Station Interface (DFSI) Internet Protocol (IP) standard communications and binary serial data protocol standard communications.

2. Related Art

There is a large installed base of early generation Association of Public-Safety Communications Officials (APCO) P25 standard digital radio base station equipment that transfers data using binary serial data connections for creating land mobile radio networks. Binary-based serial data protocols are generalized terms by which to describe conventional schemes that capture voice and other data as data streams of 1's and 0's transmitted from, or received by, a radio in a sequence. The binary-based serial data protocols are most often implemented by a particular radio interface associated with the communicating radio by which the binary serial data is transmitted and/or received. The radio interface may format, process, package, or otherwise manipulate the binary serial data to ensure that the data to be transmitted is sent in a particular order, and that the received data is managed to be presented to a particular user in a user-friendly form. Such an interface is required because streams of 1's and 0's, while providing a convenient and simple information data stream, are not human readable. The binary serial data bit streams must be interpreted by some type of computer interface in order to be translated to a user-readable form. Processing of the binary serial data bit streams may include formatting and packaging the bit streams in a manner that allows for them to be transmitted in specific order with certain header information, for example, appended to the bit streams in order to provide, for example, identifying information for particular transmission in cooperation with a binary serial data link.

Among the earlier and more standardized of the binary serial data protocols was the V.24 standard protocol. The V.24 standard was formulated, and still exists today, as an International Telecommunication Union Telecommunication Standardization Sector (ITU-T) standard for the interchange of binary serial data between two devices, e.g., the connection of a computer with a telephone modem. V.24 is commonly used interchangeably with, and considered to be essentially the same as, the more commonly used and understood RS-232 standard. When used in APCO P25 systems, the particular instantiation of the V.24 standard is considered to be largely proprietary to Motorola®.

Project 25 or P25 represents a suite of standards for digital radio communications for use primarily by federal, state/province and local public safety agencies in North America. In a P25 system, voice is converted to digital format at a user radio and transmitted over the air as 1's and 0's. In early generation Motorola® P25 base stations, the V.24 serial digital protocol was used to provide digital backhaul of P25 voice and data to fixed endpoints such as dispatch consoles. The P25 standard enables agencies and entities to communicate among themselves, with other agencies and entities, and with certain disaster/mutual aid response teams in emergencies. P25 is generally understood to provide the standard for the design and manufacture of interoperable digital two-way wireless communication products directed at supporting unique communications requirements for public safety, security, public service, and commercial communication applications.

SUMMARY OF DISCLOSED EMBODIMENTS

There are a number of protocols, techniques, methods, schemes, devices, systems and the like that may include communication interfacing components to translate from one communicating standard protocol to another. Streaming binary serial data may be transferred over an IP network using, for example, a serial tunneling protocol that simply takes the binary serial data, encapsulates the binary serial data, marks the binary serial data with an IP packet address associated with the encapsulated binary serial data, and controls transmission of the encapsulated binary serial data via a communication link. A receiving IP node may then un-encapsulate the data and "spit it out on a pair of wires" as binary serial data.

The last couple of decades have seen an explosive growth in the application of differing versions of Internet Protocol-based communications as a basis for network communications. Different standards have emerged for control of communications that may include IP components and communicating elements. As the communications protocols have continued to mature, there has emerged, for example, a new version of the P25 standard for a Digital Fixed Station Interface (DFSI) that provides a direct IP interface to P25 base station equipment. DFSI is generally understood to provide a standardized Ethernet IP-based digital backhaul method for P25 base stations. The DFSI carries both digital voice and data elements, and control messages over the interface. DFSI provides an opportunity to employ multiple devices (standard space products) from multiple vendors thereby extending the service life of in-place binary serial data-based infrastructures in network communications.

As indicated above, V.24 supported P25 communication equipment is generally understood to comprise Motorola® proprietary equipment. P25 is the standard space for wireless voice communications. V.24 is Motorola's® serial method for remote operation of radio equipment (including as a data format for moving P25 information over a serial connection). DFSI takes the standardized P25 data communication capability and provides a capacity to mix and match other types of equipment, potentially from a variety of vendors, for data exchange.

There is currently no interface for converting binary serial protocol data, in its entirety, to usable Internet Protocol data. Based on individual agency, entity and user investment in legacy binary serial protocol equipment, it would be advantageous to provide a processor or microprocessor based interface scheme, technique and/or unit, which may include digital data, e.g., Ethernet, and serial ports, by which to read formatted input data from either of the ports and convert the data to a correct protocol for data exchange via the other port.

Exemplary embodiments of the systems and methods according to this disclosure may provide an interface structure or scheme supporting full duplex operation for voice and data in each direction between binary serial protocol data, which may include V.24 standard communications, and Internet Protocol data, which may include P25 DFSI standard communications.

Exemplary embodiments may provide structures and schemes to promote interoperability with legacy communications infrastructures. These structures and schemes may afford users an opportunity to shake the yoke of proprietary format binary serial data to which the legacy communications infrastructures are tied.

Exemplary embodiments may provide hardware, software and/or firmware components with a DFSI connection on one end, so that it appears as a DFSI-equipped base station, and, on the other end may be a V.24 serial port that provides a digital P25 connection compatible with legacy base stations and comparators.

In exemplary embodiments, incoming DFSI or V.24 communication traffic, for example, may be read and converted, in real time, to an opposite format. Translation of control messages may be included, while P25 voice and data traffic bits, when used, may be passed through essentially unchanged, just formatted for transmission in the appropriate format.

Exemplary embodiments may support full duplex operation so that voice or data streams can be converted in both directions simultaneously.

Exemplary embodiments may include an additional serial port to accommodate connections to a wider variety of legacy Radio Network Controllers (RNCs) that are used to provide a data interface for legacy serial applications such as Over The Air Rekeying (OTAR). Modern OTAR using IP devices could be accommodated over the DFSI.

Exemplary embodiments may include a voice coding unit and analog audio ear and mouth (E&M) connection that would allow the disclosed structures and schemes to convert an analog format base station to a DFSI base station.

Exemplary embodiments may include a Simple Network Management Protocol (SNMP) and/or remote serial connection port to allow status and alarm monitoring and configuration changes from a separate Radio Service Software (RSS) port on compatible legacy and/or proprietary equipment.

Exemplary embodiments may provide an end-user with a system or method by which to enhance a lifetime of an existing infrastructure investment that may be based on serial binary data protocols by allowing the use of IP-based protocols with legacy communication systems that were never intended to support those protocols in communication networks and communication operating environments.

Exemplary embodiments may provide broad spectrum communications interoperability between agencies and entities using combinations of current and legacy communication equipment. The agencies and entities may include, for example, law enforcement or other governmental agencies in the United States including, but not limited to, the U.S. Department of Homeland Security.

Exemplary embodiments may uniquely provide, among other aspects, an ability to inspect and efficiently format the data in a manner that optimizes the voice and/or data transmission in one direction or the other across multiple communications protocols.

Exemplary embodiments may process incoming and outgoing data communications by implementing decisions about how to handle the information contained in, or to be contained in, the incoming and outgoing data communications based upon the substance, or overarching format, of the data contained in individual data packets, or serial data bit streams. In embodiments, decisions and determinations regarding the information may include determining that the information is damaged or corrupted and therefore not available to be converted. The data may be discarded based on such a determination.

Exemplary embodiments may perform more than simple translation from one data configuration to another as conversion between these distinct protocols provides unique challenges. Simple translation between "A" and "B" requires more than simple conversion of binary serial data bit streams in one direction or the other. In exemplary embodiments, the data streams may be inspected to determine precisely what information is being conveyed in order to properly form an IP packet. In a like manner, exemplary embodiments may inspect incoming IP packets to determine in what format the outgoing bit stream should be configured in order to properly convey the information contained in the IP packet via the binary serial data bit stream.

Exemplary embodiments may determine what category the data falls into with additional determinations being made as to what conversion needs to occur and then apply the determined configuration to the data.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for converting radio communication signals between a Digital Fixed Station Interface (DFSI) Internet Protocol (IP) standard communications and binary serial data protocol standard communications, will be described, in detail, with reference to the following drawings, in which.

DETAILED DESCRIPTION OF DISCLOSED EMBODIMENTS

The disclosed systems and methods for converting radio communication signals between DFSI IP standard communications and binary serial data protocol standard communications will generally refer to this specific utility for those systems and methods. Exemplary embodiments described and depicted in this disclosure should not be interpreted as being specifically limited to implementation in any particular communication network or infrastructure, or in any particular system architecture including differing communication protocols. Any combination of differing communication protocols that includes at least one binary serial data communication protocol and at least one internet data communication protocol is contemplated.

Specific reference to, for example, any particular computing or communicating device should be understood as being exemplary only, and not limited, in any manner, to any particular device or class of devices. The systems and methods according to this disclosure will be described as being particularly adaptable to being hosted in a networked communication environment, but should not be considered as being limited to only such an adaptation.

It will be appreciated that features and advantages of the disclosed embodiments may be set forth in the description that follows, and in part may be obvious from the description, or may be learned by practice of the disclosed embodiments. The features and advantages of the disclosed embodiments may be realized and obtained by means of the instruments and schemes particularly pointed out below. The features of the disclosed embodiments may become more fully apparent from the following description.

Various embodiments of the disclosed systems, methods, devices and schemes may be discussed in detail below. While specific implementations may be discussed, it should be understood that this is done for illustration purposes only. A person skilled in the relevant art will recognize that other components and configurations may be used without departing from the spirit and scope of the disclosed embodiments.

The disclosed embodiments may comprise a method for signal conversion and a signal converter apparatus, as well as other related embodiments employing the basic concepts of the disclosed signal conversion. The disclosed embodiments are not limited to any particular configuration for a signal converter or to any particular function or intended use for a signal conversion scheme, and may be applied to a wide variety of communicating environments and specific uses.

The disclosed embodiments may provide a signal converter, and/or a signal conversion scheme, that allows the use of legacy installed radio base equipment in DFSI IP-based networks.

Figure 1:
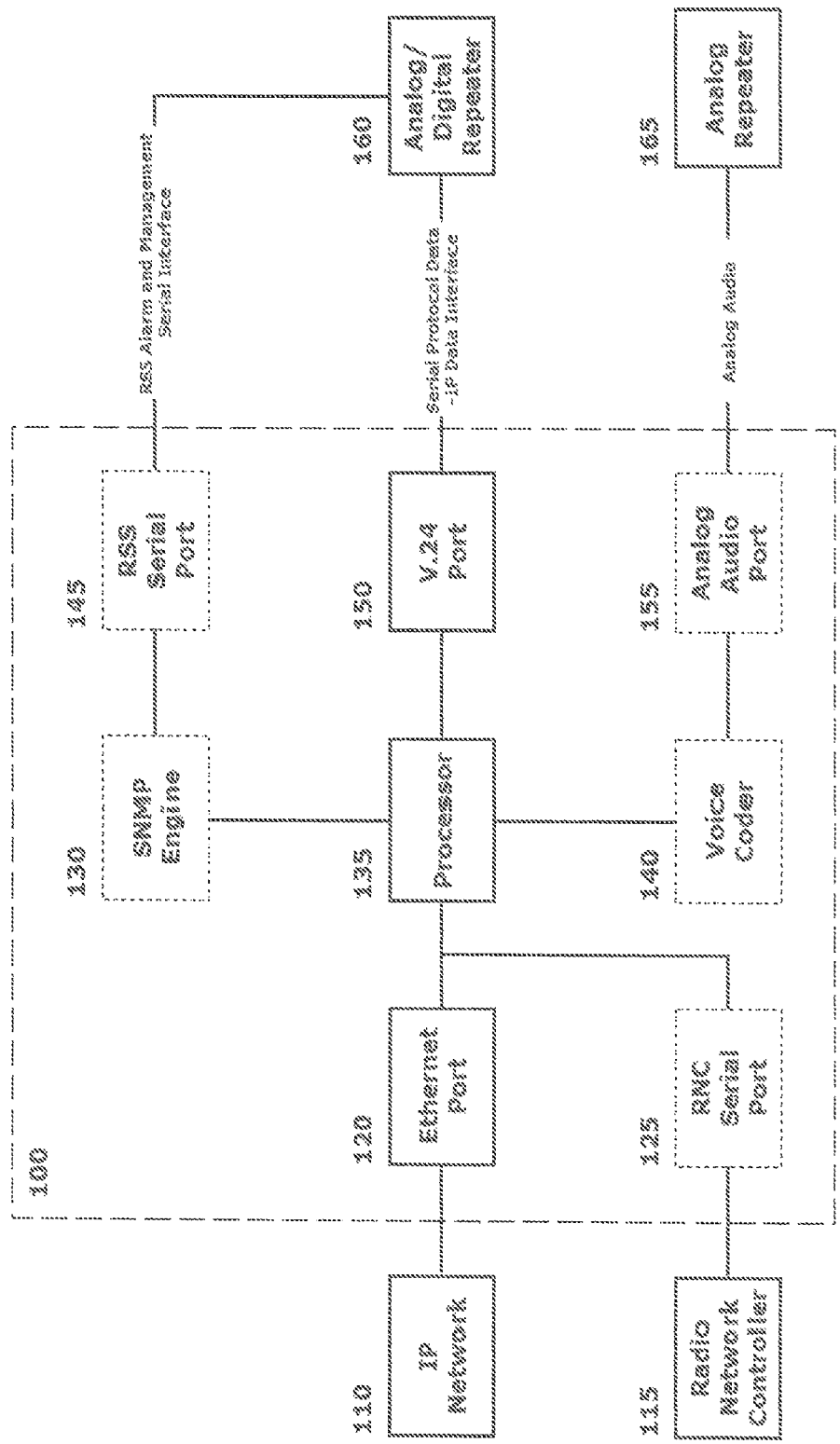
FIG. 1 illustrates a schematic diagram of an exemplary embodiment of a system showing basic DFSI to V.24 components and additional features that may implement the schemes and methods according to this disclosure.

FIG. 1 illustrates a schematic diagram of an exemplary embodiment of a system 100 showing basic DFSI to V.24 conversion components and additional features that may implement the schemes and methods according to this disclosure.

As shown in FIG. 1, the exemplary system 100 may include a microprocessor unit connected to an IP network 110 and a Radio Network Controller (RNC) 115. The microprocessor unit may include at least an Ethernet port 120 and a serial port 125. A processor 135 may be programmed to read formatted input data, and/or input data signals, from either port and to convert the formatted input data, and/or input data signals, to a correct protocol for the other port.

The exemplary system 100 may provide a unique advantage over legacy protocol converters by being specifically programmed to convert, or otherwise capable of converting, P25 standard DFSI (IP standard) signals to V.24 standard signals (to be communicated via a V.24 standard serial port 150) employed by, for example, Motorola® radio communication devices.

The exemplary system 100 may provide a combination of hardware, software and firmware components to facilitate a DFSI IP connection on one end, so that it appears as a DFSI IP-equipped base station. On the other end is a V.24 serial port 150 that may provide a digital P25 connection compatible with an analog/digital repeater 160 and/or an analog repeater 165 such as, for example, a Motorola® Quantar® base station and/or an AstroTac comparator, in such a manner that at least one embodiment appears as a legacy device, that may include a Motorola® Digital Interface Unit (DIU).

The exemplary system 100 may read incoming DFSI IP or V.24 serial data traffic and convert it in real time to the other format. Translation of control messages may be included, but the P25 voice and data traffic bits may be passed through essentially unchanged, and simply formatted for transmission in the appropriate format.

The exemplary system 100 may support full duplex operations so that voice or data streams may be converted in both directions between binary serial data protocol communications and IP communications, such as, for example, via DFSI.

The exemplary system 100 may include additional serial ports to accommodate connection of potentially, for example, Quantars® to legacy Motorola® Radio Network Controllers that are used to provide a data interface for legacy serial applications such as Over The Air Rekeying (OTAR). Modern OTAR using IP devices may be accommodated over the DFSI.

The exemplary system 100 may include a voice coding unit 140 and an analog audio (Ear and Mouth signaling connection) port 155 that may allow the exemplary system 100, acting as the converter, or implementing a conversion scheme, to convert an analog format base station to a DFSI base station.

The exemplary system 100 may include a further addition in the form of a Simple Network Management Protocol (SNMP) engine 130 and/or a remote serial connection port to allow, for example, status and alarm monitoring and configuration changes from a separate Radio Service Software (RSS) serial port 145 on compatible Motorola® equipment.

FIG. 1 generally illustrates certain specific features of the exemplary embodiment of an apparatus (converter) that may be usable to carry into effect the disclosed signal conversion scheme, with examples of applicable optional components and connections associated with certain embodiments. As noted, FIG. 1 illustrates a block diagram of an exemplary embodiment of a system according to this disclosure that includes basic DFSI to V.24 components and optional additional components.

Figure 2:
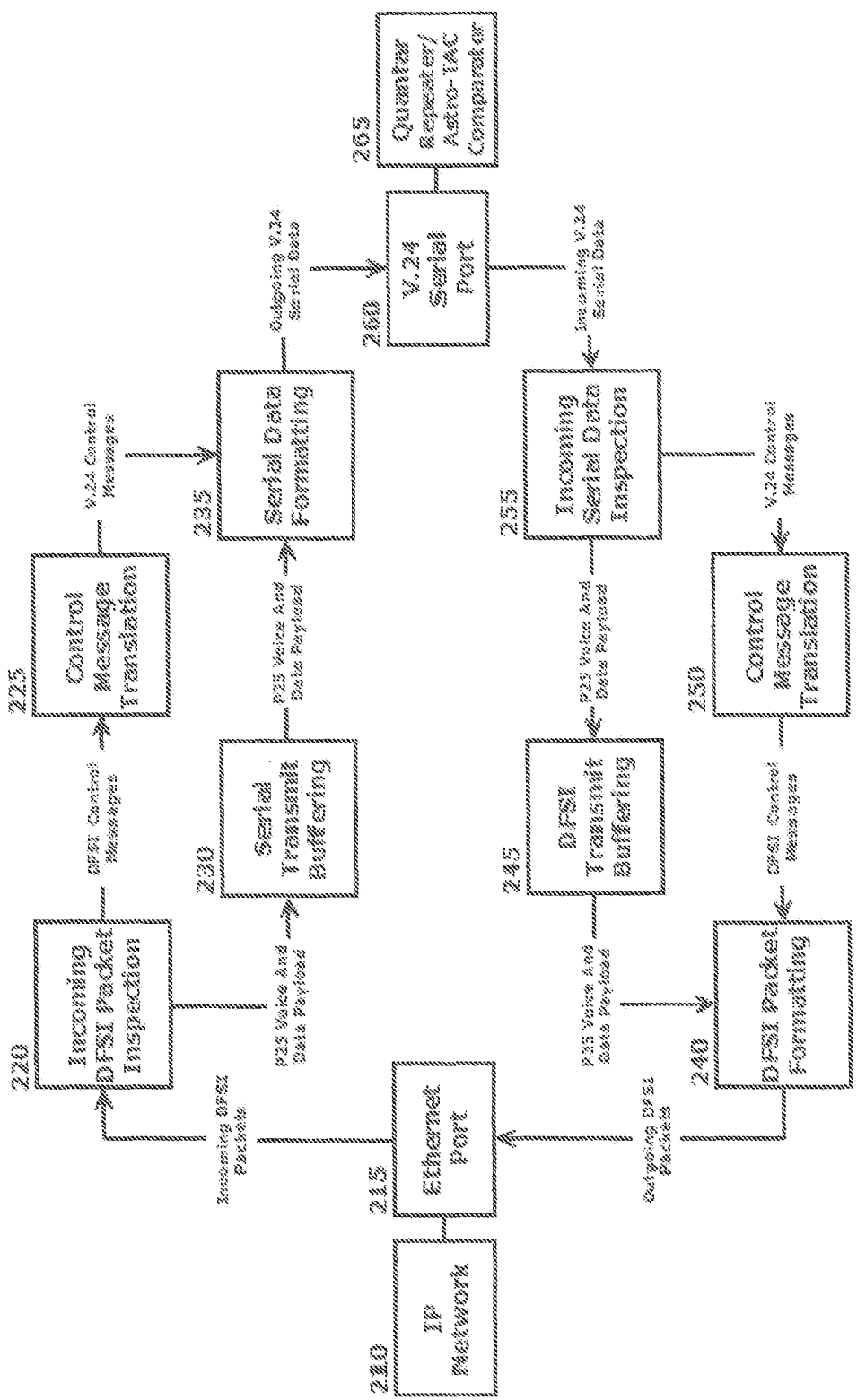
FIG. 2 illustrates a schematic diagram of an exemplary embodiment of a DFSI to and/or from V.24 conversion process according to this disclosure.

FIG. 2 illustrates a block diagram of an exemplary process for DFSI to/from V.24 conversion. The process shown in FIG. 2 is very detailed, and may be simplified or modified, as appropriate, to accomplish the desired conversion results in a streamlined manner.

As shown in FIG. 2, an IP network 210 may be of accessible via an Ethernet port 215 for processing incoming and outgoing DFSI packets to the IP network 210. FIG. 2 is intended to depict generic functional devices or programming steps by which data may be converted for input from or delivery to an output device such as, for example, a Quantar Repeater and/or an Astro-TAC Comparator 265 via a V.24 serial port 260. The functional devices or programming steps may include: incoming DFSI packet inspection 220, control message translation 225, serial transmit buffering 230 and serial data formatting 235 for the conversion of incoming DFSI packets to outgoing V.24 serial data. The functional devices or programming steps may further include a mirror of steps going in the other direction, i.e., for converting incoming V.24 serial data to outgoing DFSI packets, such as, for example, incoming serial data inspection 255, control message translation 250, DFSI transmit buffering 245 and DFSI packet formatting 240. As is clear from the depiction in FIG. 2, voice and data payloads, and the conversion of those elements, may be handled separately from the translation of control messages appropriately.

Figure 3:
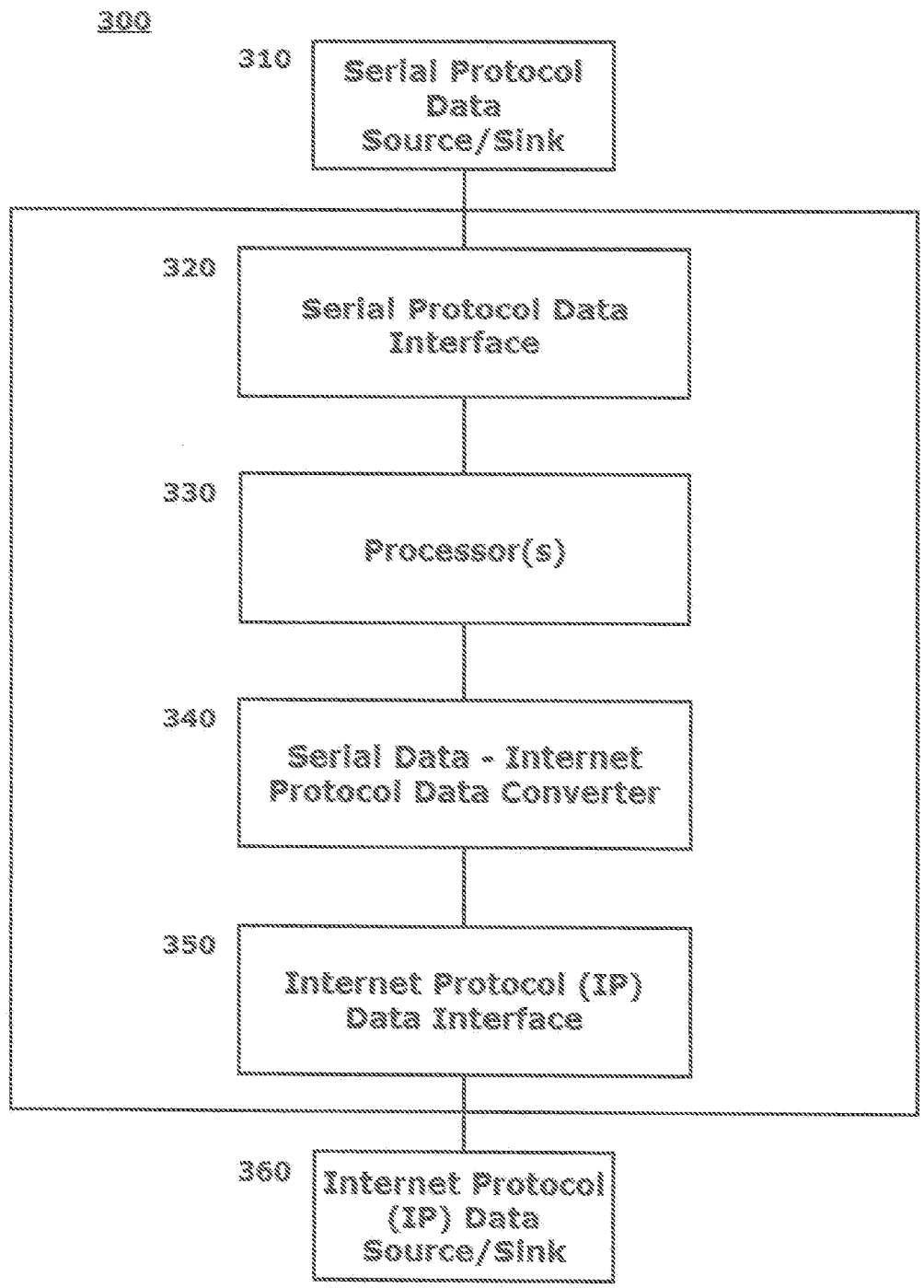
FIG. 3 illustrates a block diagram of an exemplary unit for implementing a conversion of radio communication signals between DFSI IP standard communications and binary serial data protocol standard communications according to this disclosure.

FIG. 3 illustrates a block diagram of an exemplary unit 300 for implementing a conversion of radio communication signals between DFSI IP standard communications from a DFSI IP standard communications source/sink 310 and binary serial data protocol standard communications from a binary serial data protocol standard communications source/sink

360. FIG. 3 represents a simplification of the depiction shown in FIG. 1. Information may enter the exemplary unit 300 from one of the sources, via a respective serial protocol data interface 320 and/or Internet Protocol (IP) data interface 350. Inspection of the data, separation of the data payloads from data control information, conversion of the data payloads and the data control information (headers) from one protocol to another, integration of the converted data payloads and data control information and control of output of the data to the outgoing interface may be undertaken in a serial data-Internet Protocol data converter 340, as a dedicated unit or as a portion/function of one or more processors 330.

Inspection, and associated pre-processing, of the data may include, for example, decisions (or determinations) regarding (1) whether the data is purely data, or voice data, or a combination of the two; (2) whether the data includes any encrypted elements; (3) whether the data contains any metadata; and/or (4) whether the data needs to be particularly manipulated in a manner that ensures of the individual bits are provided in a proper configuration for further processing. These decisions formulate a basis for the follow-on processing that may be required as the data is converted from one form to another in order that the communications represented by the data are accurately conveyed between individual communicating nodes. Further, the inspection and pre-processing of the data may determine that the data is corrupted. In such instances, the data may not be further processed, but may otherwise be discarded.

All of the various components of the exemplary unit 300, as depicted in FIG. 3, may be connected by one or more data/control busses. These data/control busses may provide wired or wireless communication between the various components of the exemplary unit 300, whether all of those components are housed integrally in, or are otherwise external from and connected to, the exemplary unit 300.

It should be appreciated that, although depicted in FIG. 3 as an integral unit, the various disclosed elements of the exemplary unit 300 may be arranged in any combination of subsystems as individual components or combinations of components, integral to a single unit, or external to, and in wired or wireless communication with the single unit of the exemplary unit 300. In other words, no specific configuration as an integral unit or as a support unit is to be implied by the depiction in FIG. 3, or coincidentally in FIG. 1.

Figure 4:
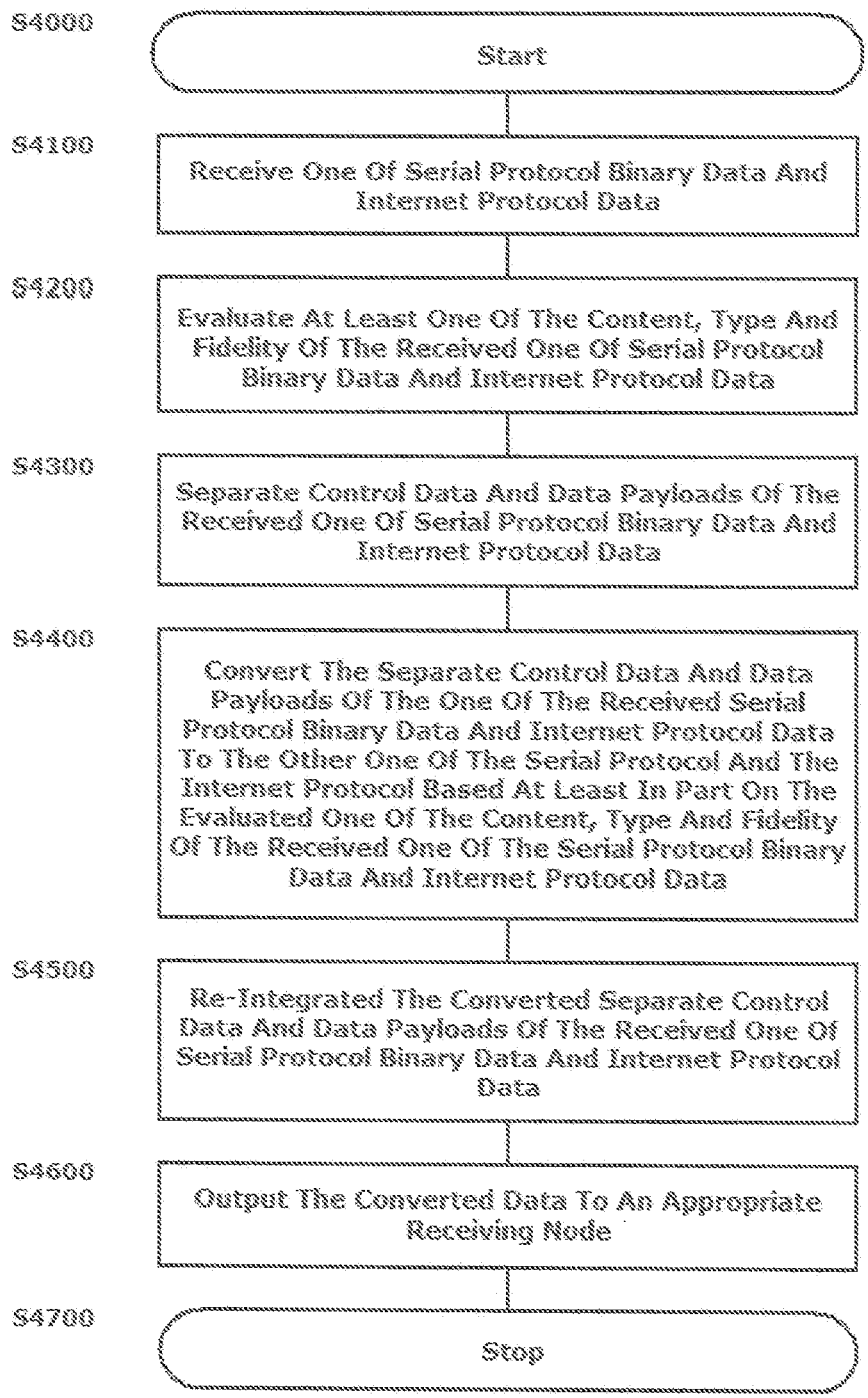
FIG. 4 illustrates a flowchart of an exemplary method for implementing a conversion of radio communication signals between DFSI IP standard communications and binary serial data protocol standard communications according to this disclosure.

The disclosed embodiments may include an exemplary method for implementing a conversion of radio communication signals between DFSI IP standard communications from a DFSI IP standard communications source/sink and binary serial data protocol standard communications from a binary serial data protocol standard communications source/sink. FIG. 4 illustrates a flowchart of such an exemplary method. As shown in FIG. 4, operation of the method commences at Step S4000 and proceeds to Step S4100.

In Step S4100, one of serial protocol binary data and Internet Protocol data may be received by a communicating system or scheme. Operation of the method proceeds to Step 4200.

In Step S4200, at least one of the content, type and fidelity of the received one of binary serial protocol data and DFSI IP data may be evaluated. The evaluation may include inspection, and associated pre-processing, of the data to include, for example, decisions (or determinations) regarding (1) whether the data is purely data, or voice data, or a combination of the two; (2) whether the data includes any encrypted elements; (3) whether the data contains any metadata; and/or (4) whether the data needs to be particularly manipulated in a manner that ensures of the individual bits are provided in a proper configuration for further processing. These decisions formulate a basis for the follow-on processing that may be required as the data is converted from one form to another in order that the communications represented by the data are accurately conveyed between individual communicating nodes. Further, the inspection and pre-processing of the data may determine that the data is corrupted. In such instances, the data may not be further processed, but may otherwise be discarded. Operation of the method proceeds to Step S4300.

In Step S4300, the at least one of the received binary serial protocol data and DFSI IP data may be separated into individual components such that the control data and the data payloads may be operated on separately. Operation of the method proceeds to Step S4400.

In Step S4400, each of the separated components of the control data and the data payloads for the one of the received binary serial protocol data and DFSI IP data may be converted to the other of the binary serial protocol data and the DFSI IP data based at least in part on the evaluated one of the content, type and fidelity of the received one of the binary serial protocol data and DFSI IP data. Operation of the method proceeds to Step S4500.

In Step S4500, once converted, the separate control data and data payloads may be re-integrated to produce converted data for output from the system or scheme. Operation of the method proceeds to Step S4600.

In Step S4600, the converted data may be output to an appropriate receiving node. Operation of the method proceeds to Step S4700, where operation of the method ceases.

The disclosed embodiments may include a non-transitory computer-readable medium storing instructions which, when executed by a processor, may cause the processor to execute some or all of the steps of the exemplary method, as outlined above.

The above-described exemplary system and method reference certain conventional components and known standard data protocols to provide a brief, general description of a suitable scheme in which the subject matter of this disclosure may be implemented for familiarity and ease of understanding. As indicated above, although not required, embodiments of the disclosed data collection, conversion, reporting and control functions according to the disclosure may be provided, at least in part, in a form of hardware circuits, firmware or software computer-executable instructions to carry out the specific functions described, such as with program modules being executed by a processor. Generally, program modules in this context include routine programs, data objects, software components, data structures, and the like that perform particular tasks (functions) or implement particular data types.

Those skilled in the art will appreciate that other embodiments of the disclosed subject matter may be practiced with many types and configurations of voice and/or data communication systems, devices, equipment and/or supporting structures.

The exemplary depicted sequence of executable instructions or associated data structures represents one example of a corresponding sequence of acts for implementing the functions described in the steps. No specific order is to be implied by the depiction presented in FIG. 4 and the accompanying description, except where a specific method step may be considered a necessary pre-condition to execution of any other method step.

Although the above description may contain specific details, they should not be construed as limiting the claims in any way. Other configurations of the described embodiments of the disclosed systems and methods are part of the scope of this disclosure. This enables each individual user to separately employ and/or exploit the benefits of the disclosure. There may be multiple instances of the components, each processing and converting specific communication data according to one protocol to specific communication data according to another protocol. It does not necessarily need to be one identical embodiment of the disclosed system used by all end individual users during any form of the disclosed data conversion process.

Accordingly, the appended claims and their legal equivalents should only define the disclosure, rather than any specific examples given.

I claim:

1. A method for facilitating voice or data communication, comprising:
   receiving, with a processor, incoming voice or data communication data in one of a Digital Fixed Station Interface (DFSI) Internet Protocol (IP) standard and a binary serial protocol (BSP) standard;
   converting, with the processor, the incoming voice or data communication data from first data according to the one of the DFSI IP standard or the BSP standard to second data according to the other of the DFSI IP standard or the BSP standard;
   directing, with the processor, the output of communication of the second data.

2. The method of claim 1, further comprising:
   evaluating, with the processor, at least one of a content, a type and a fidelity of the first data.

3. The method of claim 2, the converting of the first data to the second data being based on the evaluating.

4. The method of claim 2, the evaluating comprising determining at least one of (1) whether the first data is purely data, or voice data, or a combination of the two; (2) whether the first data includes encrypted elements; (3) whether the first data contains metadata; and (4) whether the first data needs to be particularly manipulated in a manner that ensures that the individual data bits are provided in a proper configuration for further processing.

5. The method of claim 2, the evaluating determining that the first data is corrupted, the processor discarding the first data that is determined to be corrupted.

6. The method of claim 1, the converting comprising:
   separating header data from data payloads in the first data;
   separately converting the header data and the data payloads; and
   re-integrating the converted header data and the data payloads to generate the second data.

7. The method of claim 1, the first data according to the DFSI IP standard being Project 25 DFSI data.

8. The method of claim 1, the first data according to the BSP standard being V.24 standard data.

9. A voice or data communication system, comprising:
   a first data interface for communicating DFSI IP standard data;
   a second data interface for communicating BSP standard data;
   a processor that is programmed to
      receive voice or data communication data as first data that is either of DFSI IP standard data from the first data interface or BSP standard data from the second interface;
      convert the first data according to one of the DFSI IP standard or the BSP standard to second data according to the other of the DFSI IP standard or the BSP standard; and
      direct output of communication of the second data via a corresponding one of the first data interface and the second data interface.

10. The voice or data communication system of claim 9, further comprising:
    evaluating, with the processor, at least one of a content, a type and a fidelity of the first data.

11. The voice or data communication system of claim 10, the converting of the first data to the second data being based on the evaluating.

12. The voice or data communication system of claim 10, the evaluating comprising determining at least one of (1) whether the first data is purely data, or voice data, or a combination of the two; (2) whether the first data includes encrypted elements; (3) whether the first data contains metadata; and (4) whether the first data needs to be particularly manipulated in a manner that ensures that the individual data bits are provided in a proper configuration for further processing.

13. The voice or data communication system of claim 10, the evaluating determining that the first data is corrupted, the processor discarding the first data that is determined to be corrupted.

14. The voice or data communication system of claim 9, the converting comprising:
    separating header data from data payloads in the first data;
    separately converting the header data and the data payloads; and
    re-integrating the converted header data and the data payloads to generate the second data.

15. The voice or data communication system of claim 9, the first data according to the DFSI IP standard being Project 25 DFSI data.

16. The voice or data communication system of claim 9, the first data according to the BSP standard being V.24 standard data.

17. A non-transitory computer readable medium on which is stored instructions that, when executed by a processor, cause the processor to perform the steps of a method for facilitating voice or data communication, comprising:
    receiving incoming voice or data communication data in one of a DFSI IP standard or a BSP standard;
    converting the incoming voice or data communication data from first data according to the one of the DFSI IP standard or the BSP standard to second data according to the other of the DFSI IP standard or the BSP standard;
    directing the output of communication of the second data.

18. The non-transitory computer readable medium of claim 17, further comprising:
    evaluating at least one of a content, a type and a fidelity of the first data.

19. The non-transitory computer readable medium of claim 18, the converting of the first data to the second data being based on the evaluating.

20. The non-transitory computer readable medium of claim 18, the evaluating comprising determining at least one of (1) whether the first data is purely data, or voice data, or a combination of the two; (2) whether the first data includes encrypted elements; (3) whether the first data contains metadata; and (4) whether the first data needs to be particularly manipulated in a manner that ensures that the individual data bits are provided in a proper configuration for further processing.

21. The non-transitory computer readable medium of claim 17, the converting comprising:
    separating header data from data payloads in the first data;
    separately converting the header data and the data payloads; and
    re-integrating the converted header data and the data payloads to generate the second data.

* * * * *